United States Patent [19]

Driscoll et al.

[11] 4,182,559
[45] Jan. 8, 1980

[54] EXPOSURE IDENTIFICATION ACCESSORY

[75] Inventors: John J. Driscoll, Andover; Nicholas Gold, Arlington, both of Mass.

[73] Assignee: Polaroid Corporation, Cambridge, Mass.

[21] Appl. No.: 921,453

[22] Filed: Jul. 3, 1978

[51] Int. Cl.$^2$ ............................................. G03B 17/24
[52] U.S. Cl. ................................................... 354/105
[58] Field of Search ................................ 354/105–109; 355/39, 40; 352/90, 93; 346/107 B; 350/96.25, 96.26, 96.27, 96.28

[56] References Cited

U.S. PATENT DOCUMENTS

| | | | |
|---|---|---|---|
| 2,403,911 | 7/1946 | Crowley | 346/1 |
| 3,082,424 | 3/1963 | Laird | 346/107 B |
| 3,267,555 | 8/1966 | Berger et al. | 350/96.26 X |
| 3,463,064 | 8/1969 | Klingenstein | 354/107 |
| 3,843,956 | 10/1974 | Kauneckas | 354/108 |
| 3,916,423 | 10/1975 | Ueda et al. | 354/108 |
| 4,001,846 | 1/1977 | Kauneckas | 354/105 |
| 4,096,486 | 6/1978 | Pfeifer et al. | 354/4 X |

OTHER PUBLICATIONS

Appel et al., Data Recording Apparatus for Cameras, Nov. 1977 IBM Technical Disclosure Bulletin 354–106

*Primary Examiner*—John Gonzales
*Assistant Examiner*—Thomas H. Tarcza
*Attorney, Agent, or Firm*—Alfred E. Corrigan

[57] ABSTRACT

An accessory adapted for selective attachment to a film cassette for photographically recording indicia on a film unit within the cassette. The accessory includes a base plate having an integrated circuit (IC) chip mounted thereon, a light emitting diode (LED) display and pair of spring clips for electrically and structurally interconnecting the base plate and the display in spaced parallel relation. A pair of electrical contacts extend outwardly from the base plate for connecting the IC chip with the terminals of a battery when the accessory is attached to the film cassette. A collimating screen is mounted on the surface of the LED display facing the base plate such that when the accessory is attached to the cassette the base plate is in engagement with the rear wall of the cassette and the collimating screen extends into an exposure aperture in the cassette'forward wall and into engagement with an opaque cover sheet located within the cassette. Subsequent to the loading of the cassette into a camera, the cover sheet is removed from the cassette and the first of a plurality of film units is urged into its exposure position with a small corner portion of its exposure surface in engagement with the collimating screen. When the IC detects an electrical load on the cassette's battery, it momentarily directs a flow of current from the cassette's battery to the LED display thereby illuminating the display so as to photographically record the indicia on the film unit being exposed. In a preferred embodiment, the indicia represents the date of the exposure and therefore the accessory includes its own battery for driving the display's timing circuit. Alternatively, the indicia represents the aperture setting and/or the speed of the camera's shutter.

18 Claims, 7 Drawing Figures

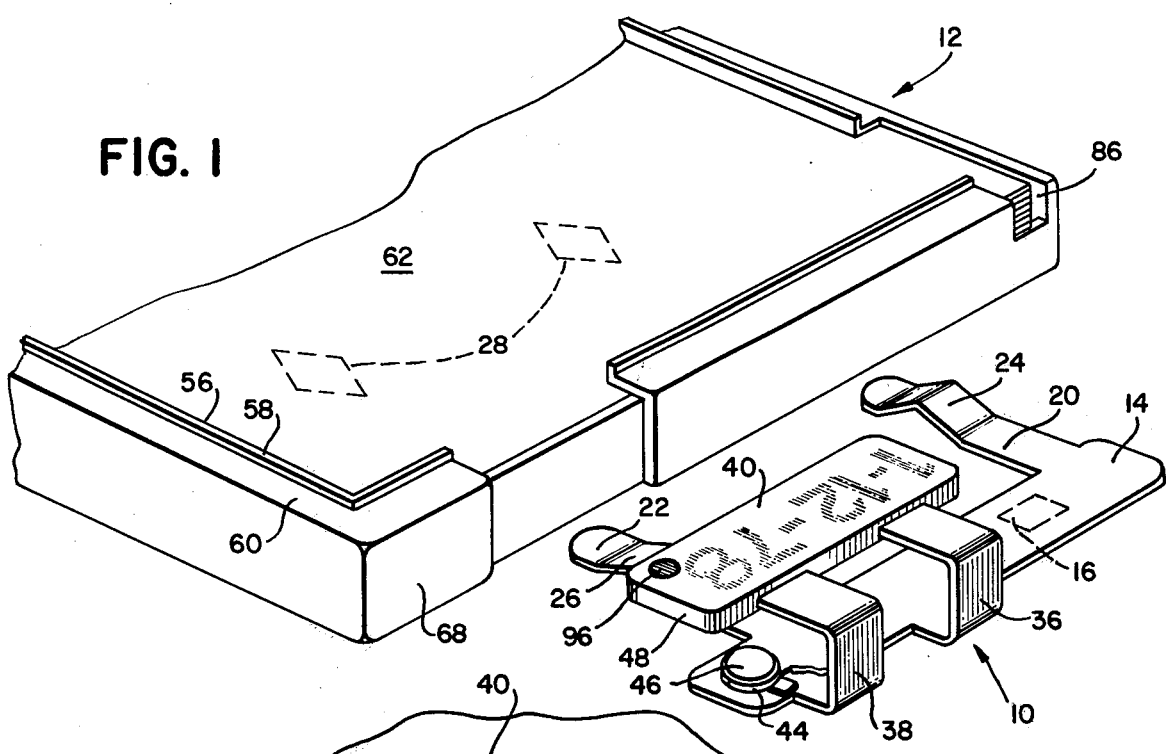
FIG. 1
FIG. 1A
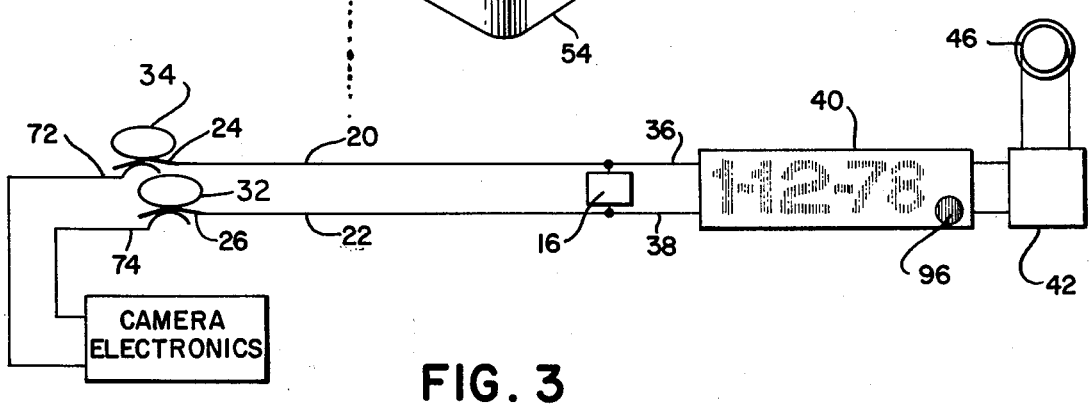
FIG. 3

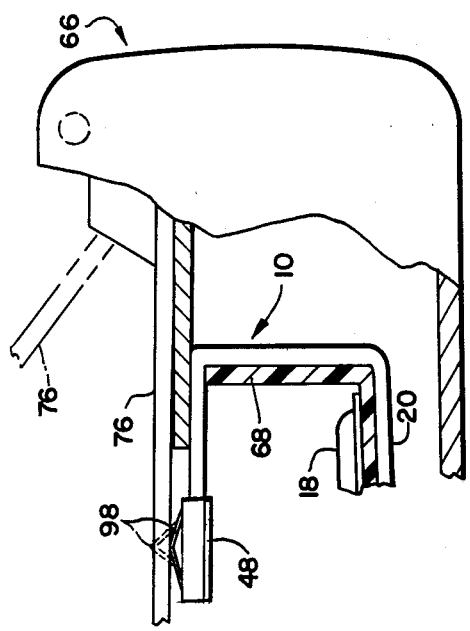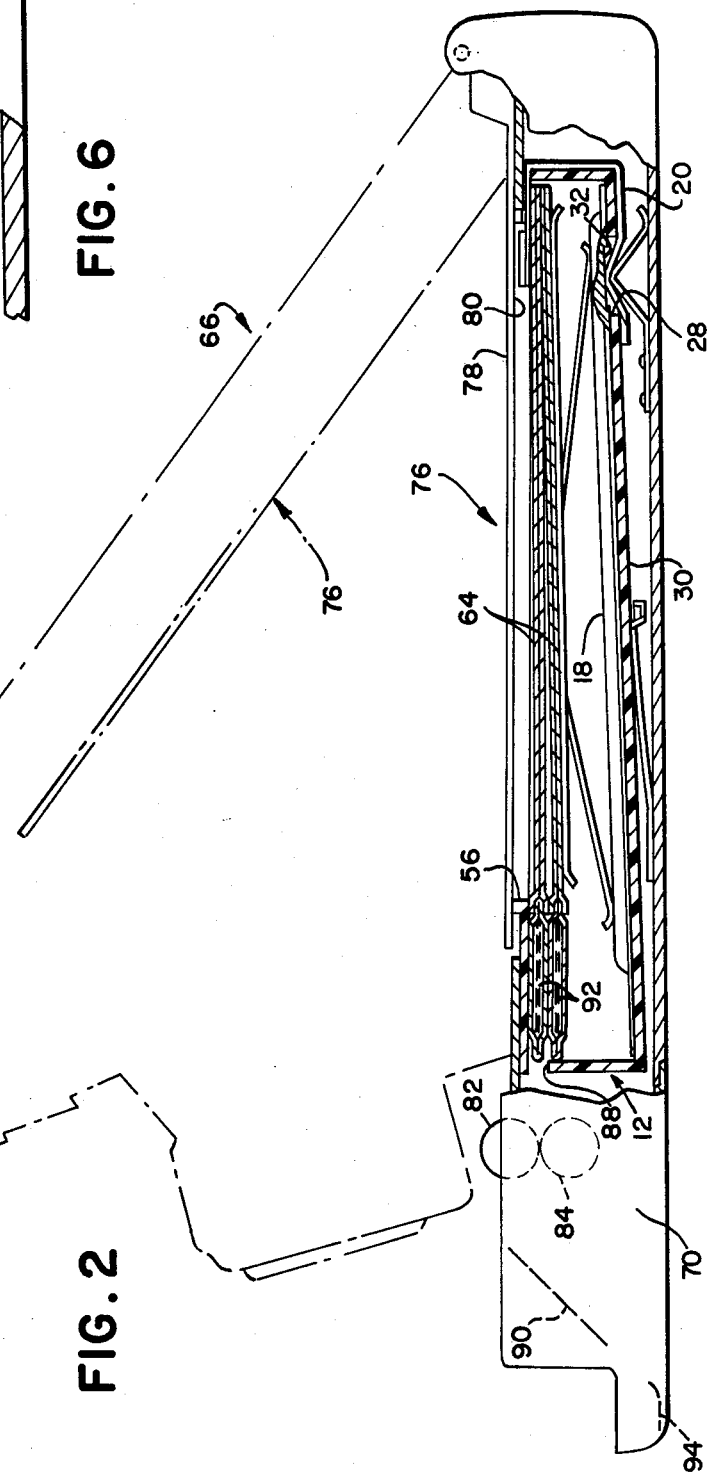

EXPOSURE IDENTIFICATION ACCESSORY

BACKGROUND OF THE INVENTION

1. Field of the Invention

This invention relates to an accessory adapted to be releasably attached to a film cassette for photographically recording indicia on a film unit, preferably during its exposure.

2. Description of the Prior Art

In the field of photography it is often important to the photographer that certain indicia be photographically recorded on a film unit at the time of its exposure. This indicia may be indicative of the date of the exposure or the speed and/or the aperture setting of the camera's shutter assembly. For example, U.S. Pat. No. 2,403,911 describes a camera system which is used to photographically record on a strip of film the date of its exposure and certain other indicia pertaining to the event being photographed. Several years later, U.S. Pat. No. 3,082,424 described an improved system wherein similar indicia was photographically recorded on a strip of film by passing the film over and in contact with a cylinder having the indicia on its circumferential surface thereby obviating the need for a lens to focus the indicia onto the film. At the appropriate time, the indicia on the cylinder would be back lighted thereby recording the image of the indicia onto the portion of the film strip in contact with the surface of the cylinder. While this latter system did away with one lens, it also created a problem of possible slippage between the surface of the cylinder and the strip of film.

The versatility of recording systems of the type described was further enhanced by the disclosures in U.S. Pat. Nos. 3,843,956 and 4,001,846. The U.S. Pat. No. 3,843,956 discloses a detachable camera back having an indicia recording system mounted therein. The camera back may be used to replace the conventional back of a camera such as a Nikon model F. The recording system uses a display including a plurality of LEDs for photographically recording indicia such as aperture and speed settings on the film unit being exposed. The U.S. Pat. No. 4,001,846 represents an improvement over the system described in the U.S. Pat. No. 3,843,956 in that it provides a means for diffusing the light from the display. However, while the latter two systems have increased the versatility of recording systems they fall far short of the apotheosis in that they are still an integral part of a camera.

SUMMARY OF THE INVENTION

The instant invention relates to an accessory which is adapted to be readily attached to a film cassette for photographically recording indicia on a film unit contained therein during its exposure. In a preferred embodiment, the accessory includes a base plate having an integrated circuit (IC) chip mounted thereon, a light emitting diode (LED) display and a pair of spring clips for electrically and structurally interconnecting the base plate and the display in spaced parallel relation. A pair of electrical contacts extend outwardly from the base plate for subsequent connection of the IC chip with the terminals of a battery which may be located within the film cassette or within a battery compartment in a camera. In order to obviate the need for a lens to focus the image of the display onto the photosensitive surface of the film unit a collimating plate is used. The collimating plate takes the form of a sheet of opaque material having a plurality of holes extending therethrough. The plate is mounted in covering relation to the LEDs such that the light from the LEDs is channeled by the holes directly onto the surface of the film unit being exposed thereby reducing to a minimum any diffusion of the light.

The accessory is adapted to be clipped onto a film cassette such that the display is located within an exposure window in a front wall of the film cassette with the collimating plate located in engagement with a dark slide or cover sheet located within the film cassette and the base plate is located in engagement with a rear wall of the film cassette with the outwardly extending electrical contacts located either in engagement with the terminals of a battery located within the film cassette or in position to be engaged by the terminals of a battery located within a camera adapted to receive the film cassette. The film cassette and attached accessory are then loaded into a camera where the film units in the cassette are adapted to be sequentially urged into the focal plane of the camera subsequent to the removal of the dark slide or cover sheet. During the exposure of a film unit, a drop in voltage occurs across the terminals of the battery. This drop in voltage may be caused by electrically coupling the camera's electronics to the battery in response to the actuation of the shutter release button. The IC chip senses this drop in voltage and momentarily completes an electrical circuit between the battery and the display thereby pulsing the LEDs to photographically record an image of their indicia upon the film unit being exposed. As stated previously, this indicia is representative of the date of the exposure but it also may represent the speed or aperture setting of the shutter. In alternative embodiments of the invention, the current sensing portion of the IC chip is replaced by a mechanical switch which is closed by one of the components of the camera during the exposure cycle or by a photocell which reacts to the incoming exposure light to momentarily couple the LEDs to a source of energy.

An object of the invention is to provide an accessory which is adapted to be releasably coupled to a film cassette so as to photographically record certain indicia upon a film unit during its exposure within a camera.

Another object of the invention is to provide an accessory of the type described with its own source of energy.

Another object of the invention is to provide an accessory of the type described with a light emitting diode display which is momentarily pulsed in response to a drop in voltage across the terminals of a battery so as to photographically record an image of its indicia onto a film unit being exposed within a camera.

Still another object of the invention is to provide an accessory of the type described with a mechanical switch which is momentarily closed in response to the movement of a component of a camera during an exposure cycle to pulse a display containing a plurality of light emitting electroluminescent devices thereby resulting in the image of their indicia being photographically recorded upon the film unit being exposed.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIG. 1 is a perspective view of a portion of a film cassette and the accessory of the instant invention;

FIG. 1A is a perspective view of a portion of the accessory partially cut away to show details of a collimating screen;

FIG. 2 is a side elevational view with parts cut away of a film cassette and its attached accessory located within a camera.

FIG. 3 is a schematic circuit diagram of the instant invention;

FIG. 6 is an enlarged view of an alternative embodiment of the invention.

DETAILED DESCRIPTION OF THE INVENTION

Figure 4:
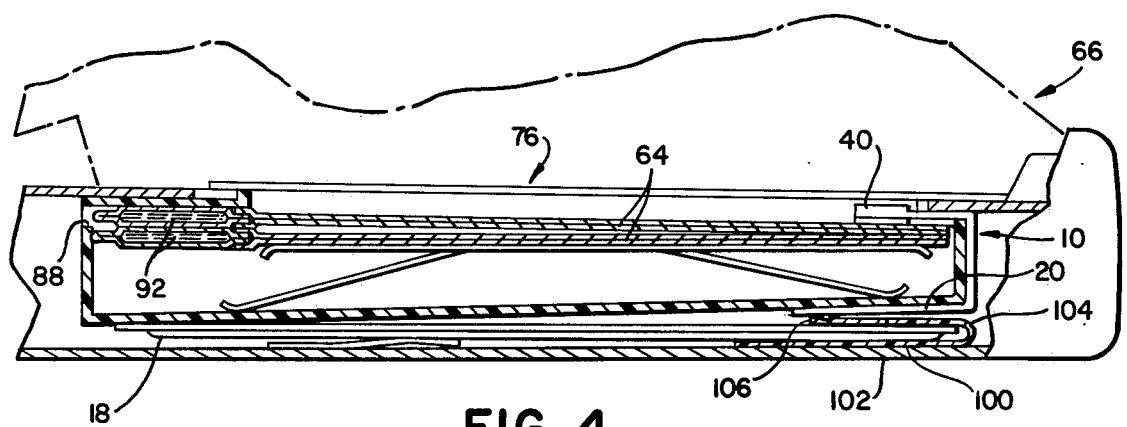
FIG. 4 is a side elevational view similar to FIG. 2 showing the contacts of the accessory in engagement with the terminals of a battery located outside of the film cassette.

Reference is now made to FIG. 1 of the drawings wherein is shown an accessory 10 and the rear end portion of a film cassette 12. The accessory 10 includes a base plate 14 having an integrated circuit (IC) chip 16 mounted therein. The chip 16 is adapted to be electrically coupled to a flat battery 18 located within the film cassette 12, see FIG. 2, by a pair of electrical contacts 20 and 22 which extend outwardly from the base plate 14. Each of the contacts 20 and 22 includes an upwardly extending portion 24 and 26 which is adapted to extend through an opening 28 in the rear wall 30 of the film cassette 12 and into engagement with one of the terminals 32 and 34 of the battery 18. A pair of resilient clip-like members 36 and 38 extend upwardly and then forwardly from the base plate 14 for supporting a light emitting diode (LED) display 40 is spaced in parallel relation to the base plate 14. In the preferred embodiment of the invention, the indicia of the display 40 is representative of the date and accordingly the display 40 carries its own IC chip 42, shows schematically in FIG. 3, and the base plate 14 includes a clip 44 for mounting a replaceable 1.5 V battery 46 for driving the display's timing circuit.

The display 40 includes a light collimator 48 consisting of a sheet of opaque material having a plurality of equidistantly spaced holes 50 therein which extend from the upper surface 52 of the collimator through its lower surface 54. The collimator 48 is mounted by any suitable means in covering relationship to the light emitting side of the LEDs such that the holes 50 direct the light from the LEDs directly onto the surface of a film unit being exposed thereby substantially obviating any diffusion of the light. It has been found that a collimator having a thickness of 0.762 mm, hole diameters of approximately 0.127 mm, and a spacing of 0.3048 mm between the centers of the holes provides satisfactory detail of the indicia being recorded onto the surface of the film unit.

The accessory 10 is adapted to be clipped onto the trailing end portion of the film cassette 12 such that the base plate 14 is in engagement with the rear wall 30 of the film cassette 12 and the contacts 24 and 26 are in engagement with the terminals 32 and 34 of the battery 18, and the display 40 is located within an exposure aperture 56 defined by an upstanding rib 58 on the cassette's forward wall 60 such that the lower surface 54 of the collimator 48 is in engagement with the surface of uppermost sheet-like element in the film cassette. In FIG. 1, the uppermost element is a dark slide or cover sheet 62 for protecting the underlying film units 64 from premature exposure, while the uppermost element in FIG. 2 is a film unit, the dark slide having been removed after the film cassette had been loaded into a camera 66, preferably of the type sold by Polaroid Corporation and identified as the Model SX-70 Land Camera.

After the accessory has been clipped on or coupled to the trailing end 68 of the film cassette 12, the cassette is then loaded into the camera 66 by pivoting its film loading door 70 in a counterclockwise manner and inserting the cassette into the camera until it is positioned as shown in FIG. 2. The loading door is then returned to its original closed position and the dark slide 62 is removed. Thus positioned, the contacts 20 and 22 of the accessory are located between and in electrical engagement with a pair of contacts 72 and 74 located within the camera and the terminals 32 and 34 of the battery 18 located in the film cassette 12. The contacts 72 and 74 are suitably connected to the camera's electronics which in turn control operation of the camera's motor and film advancing apparatus, neither of which is shown since their operation is well known. The camera 66 is now ready for the first exposure. When the camera's exposure initiating button is depressed, the battery 18 is connected to the camera's electronics and the camera's motor is momentarily energized so as to enable it to drive a gear train sufficiently long enough to free a member 76 having reflecting surfaces 78 and 80 for movement from its viewing position, as shown in solid lines in FIG. 2, to its picture taking or exposure position, as shown in broken lines in FIG. 2, as is well known in the art. The chip 16 senses the drop in voltage across the terminals 32 and 34 of the battery 18 as it is connected to the camera's electronics and momentarily completes an electrical circuit between the battery 18 and the display 40 thereby pulsing the LEDs to photographically record the date of exposure on the uppermost film unit in the film cassette 12. When the member 76 reaches its picture taking position the camera's shutter is opened and closed thereby permitting image bearing rays to enter the camera where they are reflected by the reflecting surface 80 onto the surface of the film unit 64. The camera's motor is again connected to the battery 18 by the camera's electronics. So connected, the motor drives the gear train which in turn drives the member 76 back to its original solid line position while simultaneously driving a film advancing apparatus and a pair of pressure-applying rollers 82 and 84. A portion of the film advancing apparatus enters an opening 86 in the film cassette 12 and engages the exposed film unit 64 by its trailing edge so as to advance it out of the film cassette via an exit slot 88 and into the bite of the rollers 82 and 84. The rollers 82 and 84 continue the advancement of the exposed film unit toward a deflecting plate 90 while simultaneously rupturing a pod of processing liquid 92 attached to the leading end of the film unit and spreading its contents between layers of the film unit to initiate the formation of a visible image therein. As the rollers 82 and 84 complete the spreading of the processing liquid the leading end of the exposed film unit emerges from the camera 66 via an exit 94 and the camera's electronics are disconnected from the battery 18.

Although the invention as described identifies the battery 18 as the power source for illuminating the display 40 it should be noted that the circuitry for the accessory 10 may be such that the chip 16 will momentarily connect the battery 46 to the LEDs when it senses a drop in voltage across the battery terminals 28. Further, the current sensing portion of the chip 16 may be replaced by a photocell 96 mounted on the display 40. The photocell 96 would sense the incoming exposure light and momentarily connect the LEDs with either the battery 16 or the battery 46 to briefly illuminate the LEDs thereby photographically recording an image of its indicia upon the film unit being exposed. Still further, the current sensing portion of the chip 16 may be replaced by a normally closed mechanical switch 98 which is maintained in its open position by a movable component of the camera 66, e.g., by the member 76, as shown in solid lines in FIG. 6. When the member 76 moves into its exposure position, as shown in broken lines, the switch 98 moves into its normally closed position, as shown in broken lines in FIG. 6, thereby connecting the LEDs with either the battery 18 or the battery 46 until the member 76 returns to its solid line position. Also, the battery 18 may be located outside of the film cassette 12, as shown in FIG. 4. In this embodiment the battery 18 is replaceably held in place by a clip 100 secured to a wall 102 of the camera 66. The clip 100 includes a pair of laterally spaced arms 104 (only one shown) which encircle the trailing end of the battery 18. Each arm terminates in an electrically conductive contact 106 which is adapted to engage one of the terminals 32 and 34 of the battery. Since the battery 18 will now be located below the arms 20 and 22 of the accessory 12, the contact portions 24 and 26 will now be downwardly turned so as to make electrical engagement with the camera contacts 106 when the film cassette and its attached accessory 12 are properly located within the camera, as shown in FIG. 4. Suitable means (not shown) are provided for also connecting the contacts 106 to the camera's electronics.

Figure 5:
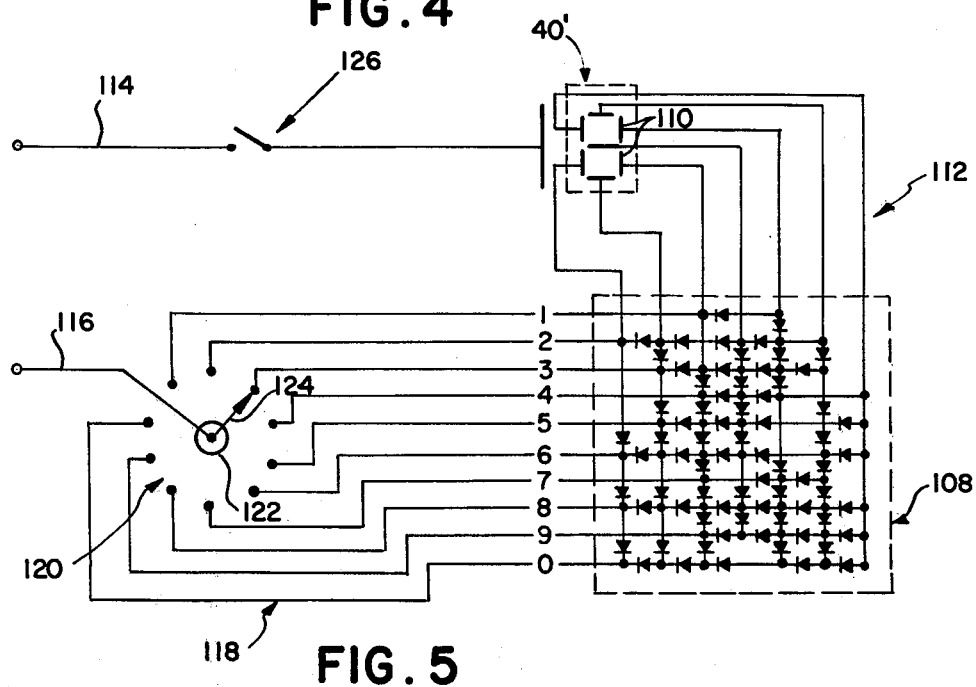
FIG. 5 is a schematic circuit diagram of an LED display circuit for use with the instant invention and its relationship with a camera mounted rotary electrical contact.

Reference is now made to FIG. 5 of the drawings wherein is shown still another embodiment of the invention. While heretofore the accessory 12 was a chronometer, this embodiment enables it to be used for recording indicia upon a film unit which is indicative of the aperture setting or speed of the camera's shutter assembly. Specifically, FIG. 5 shows a schematic circuit diagram of an LED display circuit of the type described with reference to FIG. 12 of the aforementioned U.S. Pat. No. 3,843,956. The circuit includes a diode coding matrix 108 which would be mounted on the base plate 14 in place of the chip 16, a display 40' including a plurality of LEDs 110 which are representative of a shutter aperture or speed setting and suitable wiring 112 interconnecting the two. The circuit also includes a pair of leads 114 and 116 which are adapted to be electrically coupled to the contacts 24 and 26 of the accessory 12. A plurality of leads 118 extend from the diode matrix 108 along the bottom surface of base plate 14 and toward the lead 116. Each of the leads 118 terminates is a contact 120.

An electrically conductive plate 122 is suitably connected in spaced relation to the bottom wall 102 of the camera 66. The plate 122 supports a rotary switch 124 which may be manually operated from the outside of the camera by a knob attached to the rotary switch 124, or, it may be drivingly coupled by any suitable means to the camera's lens barrel so as to complete a circuit between the battery 18 and the display 40' which will illuminate the LEDs such that their indicia will be representative of the aperture or speed setting of the camera's shutter assembly. For example, if the rotary switch 124 is in the position shown in FIG. 5 and a switch 126 is closed in response to depressing the camera's shutter release button, a circuit would be momentarily completed to the display 40' thereby illuminating six of the LEDs in such a manner that the numeral 3 would be photographically recorded on the film unit being exposed. The numeral 3 may represent an aperture setting of f/2 in an aperture series of f/1, f/1.4, f/2, f/2.8, etc. or a speed setting of ¼ second in a speed series of 1, ½, ¼, ⅛, 1/15, etc.

Since certain changes may be made in the above camera without departing from the scope of the invention herein involved, it is intended that all matters contained in the above description or shown in the accompanying drawings shall be interpreted as illustrative and not in a limiting sense.

What is claimed is:

1. An accessory adapted to be detachably coupled to a film cassette for photographically recording indicia on a film unit located within the film cassette, said accessory comprising:
    display means including a plurality of light emitting electroluminescent devices adapted to record indicia on a film unit located within the film cassette;
    an electrical circuit including means for detecting a sudden voltage drop across a battery and means for engaging the terminals of the battery for providing current for said circuit;
    means for electrically coupling said detecting means to said light emitting electroluminescent devices; and
    means for detachably coupling said accessory to the film cassette prior to loading the film cassette into a camera such that said display means is located in position to be engaged by a film unit as it is moved into its exposure position, whereby when said accessory is coupled to the film cassette and the film cassette is properly located within a camera with said engaging means in contact with the terminals of a battery used to power a component of the camera, said detecting means senses the drop in voltage across the battery upon energization of the component and momentarily directs a flow of current to said light emitting electroluminescent devices thereby illuminating said display means so as to photographically record the indicia on the film unit located in engagement with said display means.

2. An accessory as defined in claim 1 wherein said display means is a chronometer and said accessory further including means for mounting and supporting a source of electrical energy and means for electrically connecting the source of electrical energy to said chronometer to continuously drive said chronometer whereby the date of exposure is photographically recorded onto the film unit by said display means upon said detecting means sensing a drop in voltage across the battery.

3. An accessory as defined in claim 1 wherein said display means includes light collimating means mounted in covering relation to said light emitting electroluminescent devices.

4. An accessory as defined in claim 3 wherein said light collimating means comprises an opaque sheet having a plurality of holes therein for directing light from said display means to the surface of the film unit.

5. An accessory as defined in claim 4 wherein the ratio of the thickness of said sheet to the diameter of said holes is approximately 6 to 1.

6. An accessory as defined in claim 5 wherein the ratio of the distance between said holes to their diameter is approximately 1.4 to 1.

7. An accessory as defined in claim 1 wherein said indicia photographically recorded onto the film unit is representative of the aperture setting of the camera.

8. An accessory as defined in claim 1 wherein said indicia photographically recorded onto the film unit is representative of the shutter speed of the camera.

9. An accessory adapted to be detachably coupled to a film cassette for photographically recording indicia on a film unit located within the film cassette, said accessory comprising:
  display means including a plurality of light emitting electroluminescent devices adapted to record indicia on a film unit located within the film cassette and light collimating means mounted in covering relation to said light emitting electroluminescent devices;
  an electrical circuit including a photocell and means for engaging the terminals of the battery for providing current for said circuit;
  means for electrically coupling said photocell to said light emitting electroluminescent devices; and
  means for detachably coupling said accessory to the film cassette prior to loading the film cassette into a camera such that said light collimating means is located in position to be engaged by a film unit as it is moved into its exposure position, whereby when said accessory is coupled to the film cassette and the film cassette is properly located within a camera with said engaging means in contact with the terminals of a battery, said photocell senses any exposure light entering the camera and momentarily causes a flow of current to said light emitting electroluminescent devices thereby illuminating said display means so as to photographically record the indicia on the film unit located in engagement with said light collimating means.

10. An accessory adapted to be detachably coupled to a film cassette for photographically recording indicia on a film unit located within the film cassette, said accessory comprising:
  display means including a plurality of light emitting electroluminescent devices adapted to record indicia on a film unit located within the film cassette and light collimating means mounted in covering relation to said light emitting electroluminescent devices;
  an electrical circuit including a switch and means for engaging the terminals of the battery for providing current for said circuit;
  means for electrically coupling said switch to said light emitting electroluminescent devices; and
  means for detachably coupling said accessory to the film cassette prior to loading the film cassette into a camera such that said light collimating means is located in position to be engaged by a film unit as it is moved into its exposure position, whereby when said accessory is coupled to the film cassette and the film cassette is properly located within a camera with said engaging means in contact with the terminals of a battery used to power a component of the camera, said switch senses the movement of the component upon its energization and momentarily closes to direct a flow of current to said light emitting electroluminescent devices thereby illuminating said display means so as to photographically record the indicia on the film unit located in engagement with said light collimating means.

11. An accessory adapted to be detachably coupled to a film cassette of the type containing a stack of film units and a battery for powering a component of a camera for photographically recording indicia on an endmost film unit located within the film cassette, said accessory comprising:
  display means including a plurality of light emitting electroluminescent devices adapted to record indicia on an endmost film unit located within the film cassette;
  an electrical circuit including means for detecting a sudden voltage drop across the battery and means for engaging the terminals of the battery for providing current for said circuit;
  means for electrically coupling said detecting means to said light emitting electroluminescent devices; and
  means for coupling said accessory to the film cassette such that said display means is located in position to be engaged by an endmost film unit as it is moved into its exposure position, whereby when said accessory is coupled to the film cassette and the film cassette is properly located within a camera with said engaging means in contact with the terminals of the battery used to power a component of the camera, said detecting means senses a drop in voltage across the battery upon energization of the component and momentarily directs a flow of current to said light emitting electroluminescent devices thereby illuminating said display means so as to photographically record the indicia on the film unit located in engagememt with said display means.

12. An accessory as defined in claim 11 wherein said display means is a chronometer and said accessory further includes means for mounting and supporting a source of electrical energy and means for electrically connecting the source of electrical energy to said chronometer to continuously drive the latter whereby the date of exposure is photographically recorded onto the film unit by said display means upon said detecting means sensing a drop in voltage across the battery in the film cassette.

13. An accessory as defined in claim 11 wherein said display means includes light collimating means mounted in covering relation to said light emitting electroluminescent devices.

14. An accessory as defined in claim 13 wherein said light collimating means comprises an opaque sheet having a plurality of holes therein for directing light from said display means to the surface of the film unit.

15. An accessory as defined in claim 14 wherein the ratio of the thickness of said sheet to the diameter of said holes is approximately 6 to 1.

16. An accessory as defined in claim 15 wherein the ratio of the distance between said holes to their diameter is approximately 1.4 to 1.

17. An accessory as defined in claim 11 wherein said indicia photographically recorded onto the film unit is representative of the aperture setting of the camera.

18. An accessory as defined in claim 11 wherein said indicia photographically recorded upon the film unit is representative of the shutter speed of the camera.

* * * * *